US006019128A

United States Patent [19]

Reiter

[11] Patent Number: 6,019,128

[45] Date of Patent: Feb. 1, 2000

[54] FUEL INJECTION VALVE

[75] Inventor: Ferdinand Reiter, Markgröningen, Germany

[73] Assignee: Robert Bosch GmbH, Stuttgart, Germany

[21] Appl. No.: 09/101,592

[22] PCT Filed: Sep. 23, 1997

[86] PCT No.: PCT/DE97/02150

§ 371 Date: Jul. 10, 1998

§ 102(e) Date: Jul. 10, 1998

[87] PCT Pub. No.: WO98/22707

PCT Pub. Date: May 28, 1998

[30] Foreign Application Priority Data

Nov. 18, 1996 [DE] Germany .......................... 196 47 587

[51] Int. Cl.$^7$ .......................... B01D 35/02; F02M 61/16

[52] U.S. Cl. .......................... 137/549; 210/232; 210/445; 239/585.1; 239/DIG. 23

[58] Field of Search .......................... 137/549, 550; 239/585.1, 585.4, 590, 590.3, DIG. 23; 210/232, 416.4, 445, 452, 463

[56] References Cited

U.S. PATENT DOCUMENTS

| | | | |
|---|---|---|---|
| 4,946,107 | 8/1990 | Hunt . | |
| 5,335,863 | 8/1994 | De Grace | 239/DIG. 23 X |
| 5,356,079 | 10/1994 | Rahbar . | |
| 5,492,143 | 2/1996 | Cooper et al. | 137/550 X |
| 5,516,424 | 5/1996 | Strohschein . | |
| 5,525,219 | 6/1996 | Okabe et al. | 210/232 |
| 5,820,099 | 10/1998 | Rahbar et al. | 239/585.4 X |

FOREIGN PATENT DOCUMENTS

| | | |
|---|---|---|
| 40 03 228 | 8/1991 | Germany . |
| 43 25 842 | 2/1995 | Germany . |

*Primary Examiner*—John Rivell
*Attorney, Agent, or Firm*—Kenyon & Kenyon

[57] ABSTRACT

A new fuel injection valve possesses a fuel inlet fitting on which a ridge with sloping flank regions is shaped internally. A retaining section of the fuel filter has a groove which coacts with the ridge to form a snap-lock connection. The groove is shaped such that the retaining section of the fuel filter having the groove rests sealingly against the sloping flank regions of the ridge.

14 Claims, 3 Drawing Sheets

FUEL INJECTION VALVE

FIELD OF THE INVENTION

The present invention relates to a fuel injection valve.

BACKGROUND INFORMATION

U.S. Pat. No. 4,946,107 describes a conventional fuel injection valve in which a fuel filter at the inflow end of the fuel injection valve is inserted into the fuel inlet fitting. In this, a projection provided internally on the inflow end of the fuel inlet fitting snaps into a groove provided on the enveloping surface of the fuel filter in order to secure the fuel filter on the fuel inlet fitting. The fuel inlet fitting has a stepped bore whose step offers a stop for the fuel filter being inserted. In addition, a retaining collar which projects radially beyond the inflow end of the fuel inlet fitting and also comes to a stop against the inflow-end face of the fuel inlet fitting, is provided. This prevents the fuel filter from penetrating too far into the fuel inlet fitting. The conventional fuel injection valve has several disadvantages. The stepped bore provided in the fuel inlet fitting and the configuration of the projection which snaps into the groove of the fuel filter require a material-removing machining method, so that there is a not inconsiderable production outlay in order to prepare the fuel inlet fitting to receive the fuel filter. On the other hand, configuring the retaining collar on the fuel filter requires a relatively complexly shaped injection-molded element for production of the fuel filter using a plastic injection-molding method.

It is particularly disadvantageous, however, that a completely satisfactory sealing effect is not present between the fuel inlet fitting and the fuel filter. Sealing between the fuel filter and the inflow end of the fuel inlet fitting is impaired in particular by the fact that the plastic material of the fuel filter can swell or shrink as the result of a chemical or physical interaction with the fuel to be filtered, which can considerably impair the fit between the fuel inlet fitting and the fuel filter.

Other fuel injection valves having fuel filters inserted into the inflow end of the fuel inlet fitting are described in German Patent Application No. 43 25 842 and U.S. Pat. No. 5,356,079. These conventional fuel injection valves differ substantially from the fuel injection valve described in U.S. Pat. No. 4,946,107 in that the snap connection between the fuel inlet fitting and the fuel filter is provided not internally but externally on the fuel inlet fitting. The disadvantages described above—in particular the fact that the snap elements to be provided on the fuel inlet fitting must be produced using a material-removing production method, that the fuel filter is of relatively complex shape because of the retaining collar, and that because of the swelling or shrinkage behavior of the plastic material of the fuel filter, sealing between the fuel filter and the fuel inlet fitting is unsatisfactory—also exist for the fuel injection valves evident from the two last-named documents.

German Patent Application 40 03 228 discloses a fuel injection valve in which the fuel filter is pressed into the fuel inlet fitting. This fuel filter is equipped at the periphery with, for example, a brass ring that constitutes a pairing with the wall of the fuel inlet fitting when the fuel filter is pressed in. When the fuel filter equipped with a brass ring is pressed in, however, there exists a risk of the occurrence of abrasion and chips, which may be detached because of the compressive stress between the fuel filter and fuel inlet fitting and cause contamination in the fuel injection valve. Here again, unsatisfactory sealing can occur between the brass ring of the fuel filter and the fuel inlet fitting if the fuel inlet fitting is made of a different metal which has a coefficient of thermal expansion different from the brass of the attachment ring of the fuel filter, so that the risk exists that heating of the fuel injection valve due to engine heat will create a gap which does not seal. A further disadvantage is that because of the relatively large pressing forces to be applied when the brass ring of the fuel filter is pressed into the fuel inlet fitting, it is practically impossible to remove the fuel filter from the fuel inlet fitting thereafter.

SUMMARY OF THE INVENTION

The fuel injection valve according to the present invention has an advantage that the fuel filter and the fuel inlet fitting are manufactured particularly economically in terms of both cost and material.

A particular advantage is the fact that sealing between the fuel filter and the fuel inlet fitting is reliably guaranteed even if the fuel filter shrinks or swells as a result of a chemical or physical interaction with the fuel flowing through the fuel filter. This is achieved by using the particular shape of the groove provided on the retaining section of the fuel filter, and of the ridge of the fuel inlet fitting which snaps into the groove. In this context the ridge has at least one, generally two, sloping flank region(s), such that the opening cross section of the fuel inlet fitting continuously narrows or widens in the region of the sloping flank regions. The sealing effect between the retaining section having the groove and the ridge of the fuel inlet fitting is maintained, because of the slope of the flank regions, even if the retaining section, manufactured preferably from a plastic material, swells or shrinks. The only result of the expansion or shrinkage of the retaining section is that the contact point of the retaining section of the ridge is displaced within the flank region, without interrupting the sealing effect. Any flow of fuel between the fuel filter and the fuel inlet fitting, bypassing the fuel filter, is thereby reliably prevented, so that unfiltered fuel cannot get into the fuel injection valve.

A further advantage is that the ridge can be shaped onto the fuel inlet fitting by using a non-material-removing manufacturing method. The ridge can be pressed into the fuel inlet fitting, for example, by rolling. Material-removing machining of the fuel inlet fitting, for example by lathe-turning, to prepare it to receive the fuel filter, is not necessary. The fuel filter can consist entirely of a plastic material and can, for example, be produced by means of a plastic injection-molding method. There is no need to introduce or attach metal parts. The groove coacting with the ridge of the fuel inlet fitting can be shaped concurrently as the fuel filter is produced, with no need for an additional processing step. As a result, substantial savings in manufacturing costs can be realized.

DETAILED DESCRIPTION OF THE DRAWINGS

Figure 1:
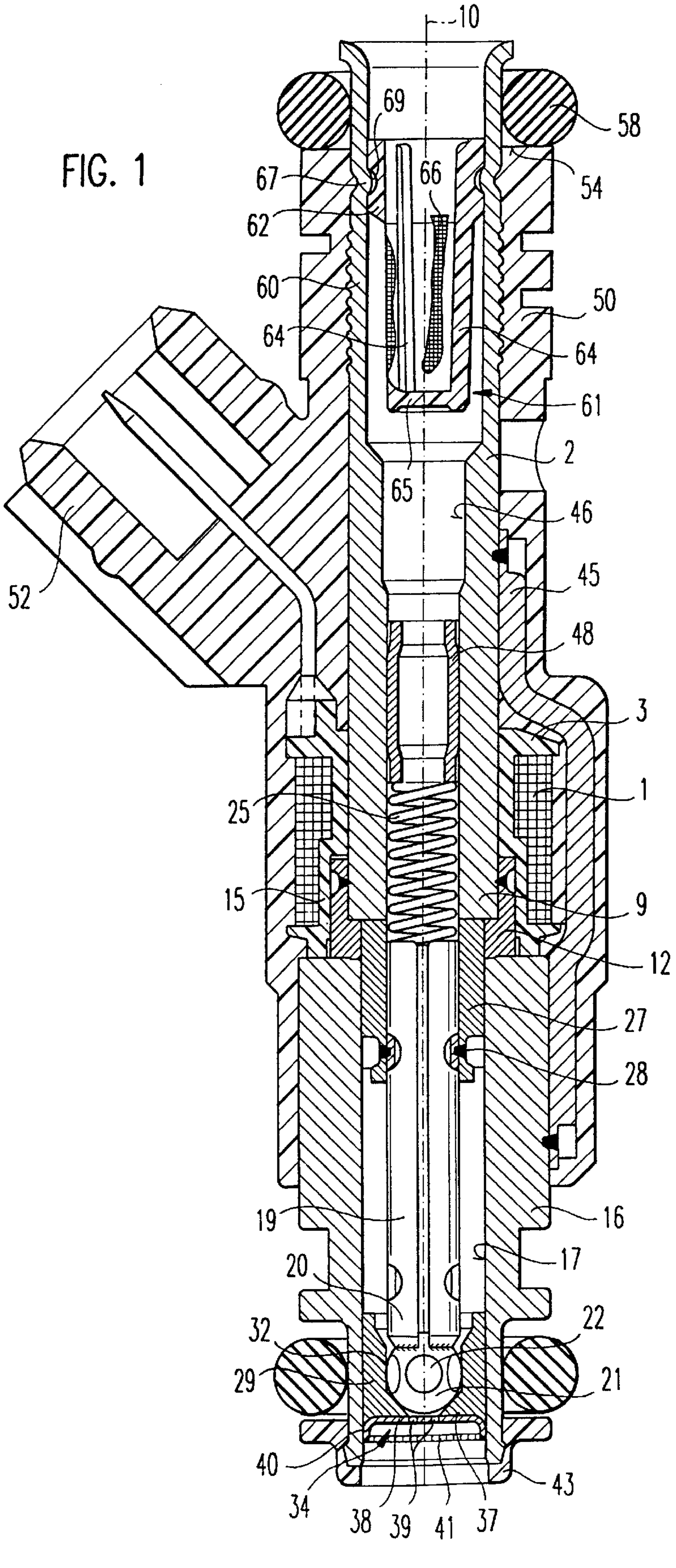
FIG. 1 shows a fuel injection valve including a fuel filter according to the present invention.

The electromagnetically actuatable valve depicted as an example in FIG. 1, in the form of an injection valve for fuel injection systems of mixture-compressing, spark-ignited internal combustion engines, has a tubular core 2 surrounded by a magnet coil 1. A coil body 3 stepped in the radial direction receives a winding of magnet coil 1, and in combination with core 2 makes possible a particularly compact configuration of the injection valve in the region of magnet coil 1.

A tubular metallic spacer element 12 is sealedly joined, for example by using of welding, concentrically with a longitudinal valve axis 10, to a lower core end 9 of core 2, thereby partially axially surrounding core end 9. The stepped coil body 3 partially overlaps core 2, and at least partially axially overlaps spacer element 12 with a step 15 of greater diameter. Extending downstream from coil body 3 and spacer element 12 is a tubular valve seat support 16 which is joined, for example, immovably to spacer element 12. Extending in valve seat support 16 is a longitudinal bore 17 which is configured concentrically with longitudinal valve axis 10. Arranged in longitudinal bore 17 is a, for example, tubular valve needle 19 which is joined, for example by using welding, at its downstream end 20 to a spherical valve closure element 21, on whose periphery, for example, five flattened areas 22 are provided to allow fuel to flow past.

Actuation of the injection valve is accomplished, in a conventional manner, electromagnetically. The electromagnetic circuit having magnet coil 1, core 2, and an armature 27 serves for axial movement of valve needle 19, and thus for opening against the spring force of a return spring 25 or closing of the injection valve. Armature 27 is joined by a first weld bead 28 to the end of valve needle 19 facing away from valve closure element 21, and aligned with core 2. A cylindrical valve seat element 29, which has an immovable valve seat, is sealedly mounted in longitudinal bore 17, by welding, into the end of valve seat support 16 that is located downstream and faces away from core 2.

A guide opening 32 of valve seat element 29 serves to guide valve closure element 21 during the axial movement of valve needle 19 with armature 27 along longitudinal valve axis 10. Spherical valve closure element 21 coacts with the valve seat of valve seat element 29 which tapers in the form of a truncated cone in the flow direction. The periphery of valve seat element 29 has a slightly smaller diameter than longitudinal bore 17 of valve seat support 16. At its end face facing away from valve closure element 21, valve seat element 29 is joined concentrically and immovably, for example using a peripheral sealed second weld bead 37 configured, for example, by using a laser, to a perforated spray disk 34 that is, for example, of cup-shaped configuration.

Cup-shaped perforated spray disk 34 possesses, in addition to a base part 38 to which valve seat element 29 is attached and in which one or more, for example four, spray openings shaped by electrodischarge machining or stamping extend, a peripheral retaining rim 40 extending downstream. Retaining rim 40 is bent conically outward in the downstream direction, so that it rests against the inner wall of valve seat support 16 defined by longitudinal bore 17, a radial pressure thus being present. Direct flow of fuel into an intake duct of the internal combustion engine outside spray openings 39 is also prevented by a third weld bead 41 between perforated spray disk 34 and valve seat support 16. A protective cap 43 is arranged at the periphery of valve seat support 16 on its end lying downstream and facing away from core 2, and is joined to valve seat support 16, for example, by using of a snap lock.

The insertion depth of valve seat element 29 with the cup-shaped perforated spray disk 34 determines the default setting of the linear stroke of valve needle 19. In this context, the one end position of valve needle 19, when magnet coil 1 is not energized, is defined by contact of valve closure element 21 against the valve seat of valve seat element 29, while the other end position of valve needle 19, when magnet coil 1 is energized, results from contact of armature 27 against core end 9.

Magnet coil 1 is surrounded by at least one conductive element 45, configured for example as a yoke serving and as ferromagnetic element, which at least partially surrounds magnet coil 1 in the peripheral direction and rests with its one end against core 2 and with its other end against valve seat support 16 and can be joined to the latter, for example, by welding, soldering, or adhesive bonding.

An adjustment sleeve 48, inserted into a flow bore 46 of core 2 running concentrically with longitudinal valve axis 10, which is configured for example from rolled spring steel sheet, serves to adjust the spring preload of return spring 25, resting against adjustment sleeve 48, which in turn is braced at its opposite side against valve needle 19.

The present invention valve is largely enclosed by an injection-molded plastic sheath 50 which, proceeding from core 2, extends in the axial direction over magnet coil 1 and the at least one conductive element 45 to valve seat support 16, the at least one conductive element 45 being completely covered axially and in the peripheral direction. Belonging to said injection-molded plastic sheath 50 is, for example, a co-injected electrical connector 52. An upper side surface 54 of injection-molded plastic sheath 50 offers a support surface for an upper sealing ring 58.

Core 2 forms, at its inflow end, a fuel inlet fitting 60. Fuel filter 61 according to the present invention is set into fuel inlet fitting 60 (as is more clearly evident from the enlarged depiction shown in FIG. 2), and serves to filter out those fuel constituents which, because of their size, might cause clogging and damage in the fuel injection valve. Fuel filter 61, produced from a plastic material, for example by using a plastic injection molding method, has a peripheral retaining section 62. Retaining section 62 ends in the downstream direction in a step 63. Shaped onto retaining section 62 are (in the exemplary embodiment) three webs 64, extending in the axial direction and set 120 degrees apart on the periphery of fuel filter 61, which are joined to one another at the downstream end of fuel filter 61 by using filter base 65. Filter element 66 serving to filter the fuel flowing through fuel filter 61 is thus surrounded by retaining section 62, webs 64, and filter base 65, and in a conventional manner can consist, for example, of a polyamide fabric that is co-injected in fuel filter 61 during production.

According to the present invention, fuel inlet fitting 60 has a preferably peripheral inwardly curved ridge 67. Ridge 67 is preferably produced by using a non-material-removing manufacturing process, since the latter is particularly economical. Ridge 67 can, for example, by shaped by the fact that fuel inlet fitting 60 is rolled on a bar-like die so that ridge 67 is pushed inward and a channel 68 simultaneously forms externally. When plastic injection-molded sheath 50 is later overmolded, this has the additional advantage that plastic injection-molded sheath 50 adheres better in the region of fuel inlet fitting 60 because of channel 68.

Retaining section 62 has a groove 69, coacting with ridge 67, which is preferably configured peripherally in retaining section 62 of fuel filter 61. Groove 69 can be concurrently shaped, even as fuel filter 61 is being produced, by using a plastic injection-molding method, with no need for a separate production step for the purpose. When fuel filter 61 is slid or pressed into fuel inlet fitting 60, the region of tapered configuration downstream from step 63 can easily be pushed through ridge 67 until step 63 is resting against ridge 67. By means of elastic deformation of a snap lug 70 placed between groove 69 and step 63, and possibly additional elastic deformation of ridge 67, ridge 67 snaps into groove 69. Since a region 71 of retaining section 62 upstream of groove 69 is of substantially longer and more massive configuration than snap lug 70, it is possible, by limiting the pressing force acting via an indentation die on the inflow-end face of fuel filter 61, to prevent fuel filter 61 from sliding beyond ridge 67 and thus penetrating farther than intended into flow bore 46.

The configuration according to the present invention of ridge 67 and groove 69, and their coaction, will be described in more detail below with reference to FIG. 3.

Figure 3:
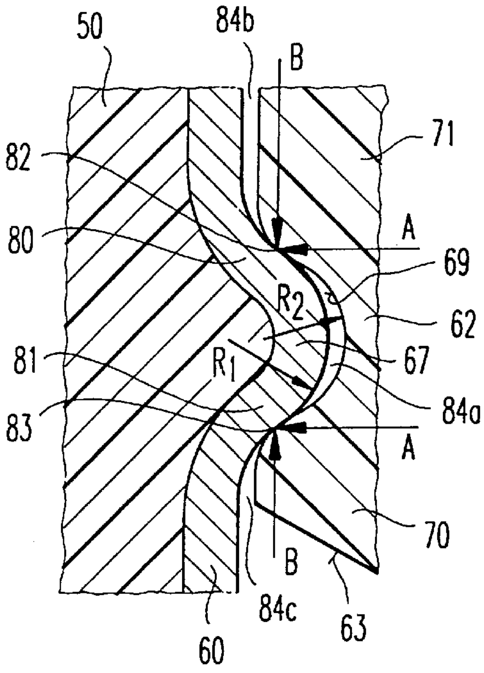
FIG. 3 shows a region of the snap connection between the fuel filter and the fuel inlet fitting.

In the exemplary embodiment depicted in FIG. 3, ridge 67 is shaped in wave-like manner, and has an upstream sloping flank region 80 and a downstream sloping flank region 81. In the upstream sloping flank region 80, the opening cross section of fuel inlet fitting 60 narrows continuously in the fuel flow direction, while in the downstream sloping flank region 81, the opening cross section of fuel inlet fitting 60 widens continuously. Groove 69 is shaped in retaining section 62 in such a way that retaining section 62 rests against sloping flank regions 80 and 81 of ridge 67 at two annularly peripheral contact points 82 and 83 which in ideal circumstances are linear. Because of the specific configuration of groove 69 and ridge 67, there is created between contact points 82 and 83, and upstream of contact point 82 and downstream of contact point 83, a gap which prevents direct contact of retaining section 62 of fuel filter 61 against fuel inlet fitting 60 in these regions. The gap is subdivided into a first gap region 84*a* between contact points 82 and 83, a second gap region 84*b* upstream of contact point 82, and a third gap region 84*c* downstream of contact point 83. The pressing force elicited by a slight elastic deformation of retaining section 62 and/or of fuel inlet fitting 60 creates a seal at contact points 82 and 83 which prevents fuel from flowing or dripping in unfiltered fashion through gap regions 84*a*, 84*b*, and 84*c* along the exterior of retaining section 62 of fuel filter 61, bypassing filter element 66.

The configuration according to the present invention of ridge 67 and groove 69 described above has the advantage that the sealing closure between retaining section 62 of fuel filter 61 and fuel inlet fitting 60 is maintained even if the plastic material of fuel filter 61, in particular of retaining section 62, experiences a shrinkage or an expansion (for example, due to swelling) as a result of a chemical or physical interaction with the fuel to be filtered. If retaining section 62 expands during operation of the fuel injection valve, contact points 82 and 83 are displaced outward, as indicated by radially acting force pair AA in FIG. 3. Gap region 84*a* is thereby elongated, and gap regions 84*b* and 84*c* are correspondingly shortened. Since contact points 82 and 83 rest against flank regions 80 and 81 of sloping configuration, it is nevertheless guaranteed that the sealing closure between retaining section 62 and fuel inlet fitting 60 will be maintained even in the event of an expansion of retaining section 62 and a displacement of contact points 82 and 83 associated therewith.

Similarly, sealing closure between retaining section 62 and fuel inlet fitting 60 is maintained even if retaining section 62 shrinks during operation of the fuel injection valve due to interaction with the fuel. In this case an axial force component illustrated in FIG. 3 by axial force pair BB acts on ridge 67, and contact points 82 and 83 come closer to one another so that gap region 84*a* is shortened and gap regions 84*b* and 84*c* are correspondingly lengthened. Within a broad expansion or shrinkage range of retaining section 62, the contours of groove 69 and ridge 67 always make contact at two shared contact points 82 and 83. In the exemplary embodiment depicted in FIG. 3, the function described above is achieved in that the cross-sectional contour of wave-shaped curved ridge 67 has at its vertex a radius of curvature $R_1$ which is greater than the radius of curvature $R_2$ at the vertex of the cross-sectional contour of groove 69, also of wave-like configuration.

Figure 4:
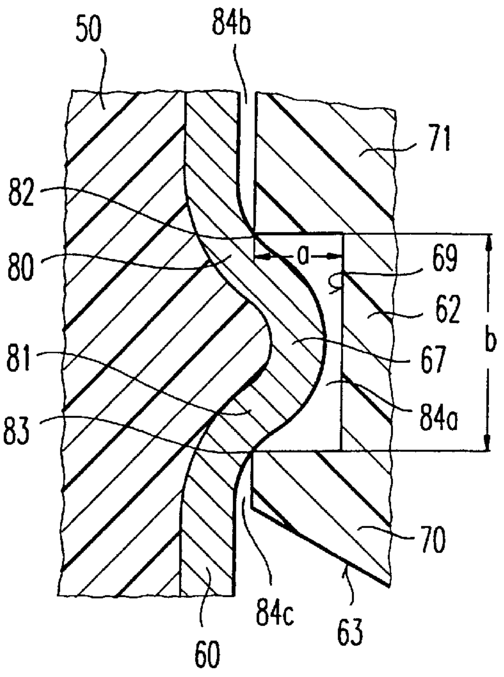
FIG. 4 shows an alternative exemplary embodiment of the snap connection between the fuel filter and the fuel inlet fitting.
Figure 5:
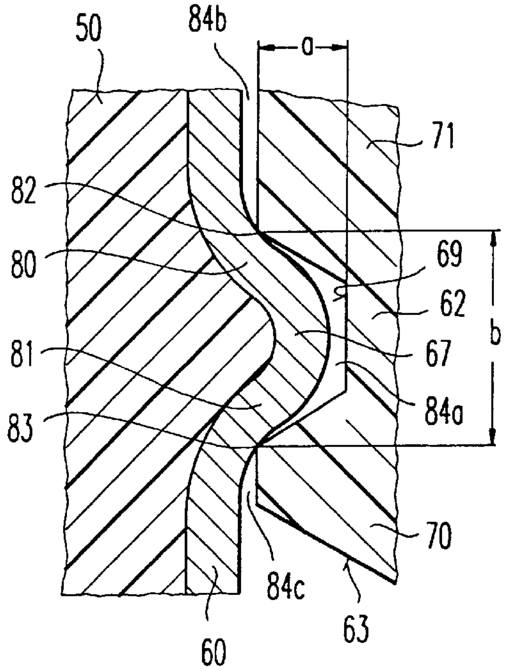
FIG. 5 shows another alternative exemplary embodiment of the snap connection between the fuel filter and the fuel inlet fitting.
Figure 6:
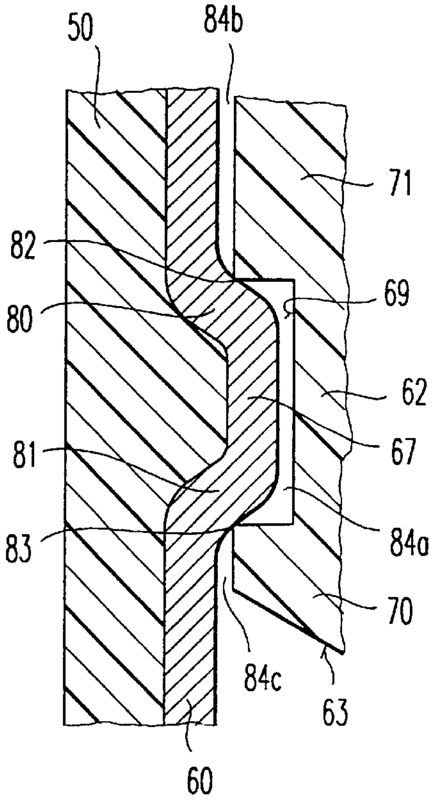
FIG. 6 shows yet another alternative exemplary embodiment of the snap connection between the fuel filter and the fuel inlet fitting.

The function according to the present invention can, however, also be achieved in identical or similar fashion by using other configurations of the cross-sectional contour of ridge 67 or of the cross-sectional contour of groove 69. Corresponding alternative exemplary embodiments are illustrated in FIGS. 4 to 6. In the alternative exemplary embodiments of FIGS. 4 to 6, elements already described are given concordant reference characters, thus rendering superfluous any description with reference thereto.

Figure 2:
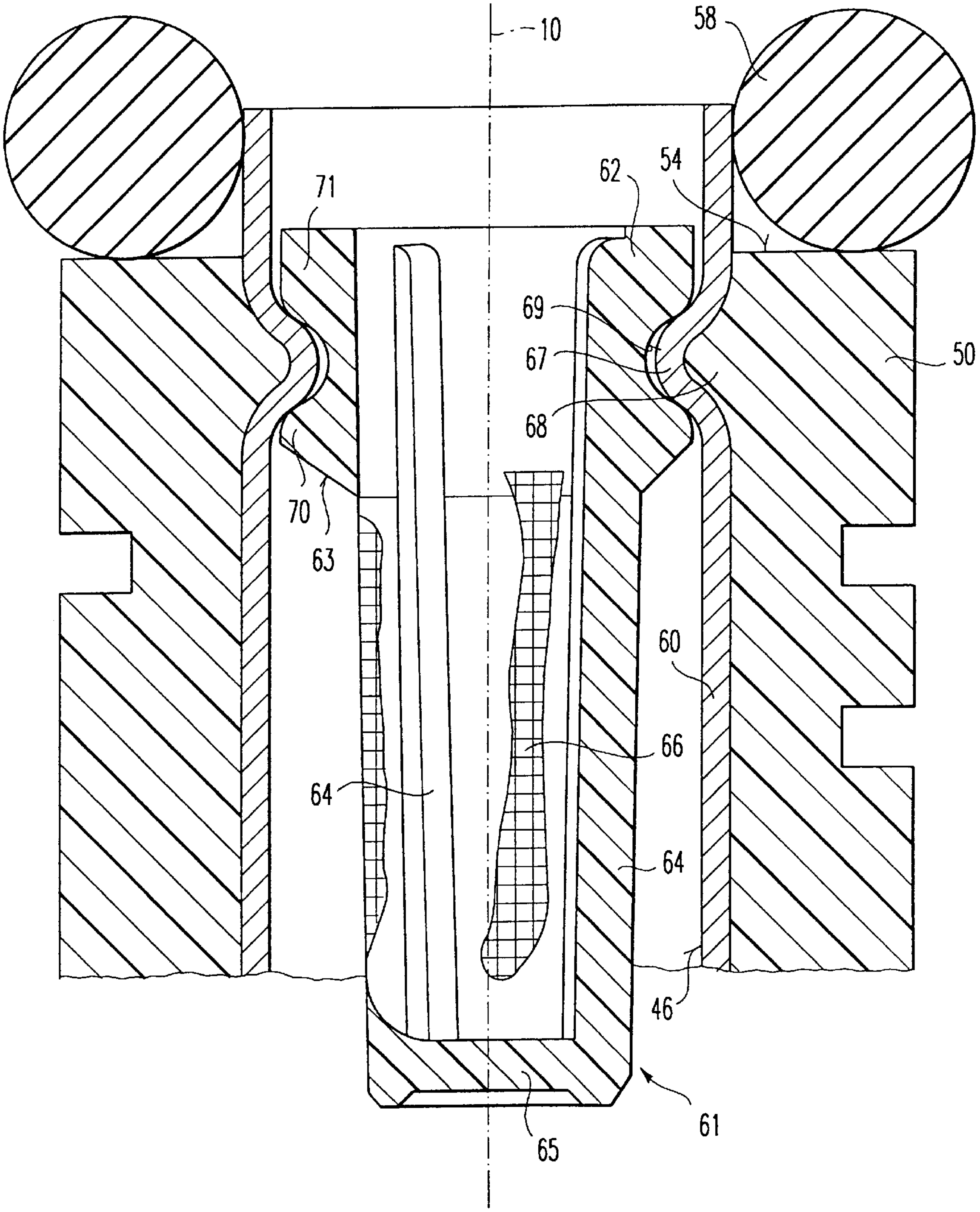
FIG. 2 shows a region of the fuel filter.

The alternative exemplary embodiment depicted in FIG. 4 differs from the exemplary embodiment already described with reference to FIGS. 1 to 3 in that the cross-sectional contour of groove 69 is of rectangular configuration. In the case of this exemplary embodiment as well, retaining section 62 rests against the sloping flanks 80 and 81 of ridge 67 at the two peripheral contact points 82 and 83. In the case of this exemplary embodiment as well, the sealing effect at these contact points 82 and 83 is maintained regardless of whether fuel filter 61, in particular its retaining section 62, is subjected to expansion or shrinkage as a result of interaction with the fuel. The ratio between the depth a and width b of groove 69 can be adapted to the ratio between the axial and radial expansion or shrinkage, which depends on the material properties of the plastic used to configure fuel filter 61. The same applies to the ratio between radii $R_1$ and $R_2$ of the exemplary embodiment depicted in FIGS. 1 through 3.

In the case of the exemplary embodiment depicted in FIG. 5, the cross-sectional contour of groove 69 is of trapezoidal configuration. In this exemplary embodiment as well, retaining section 62 of fuel filter 61 rests against peripheral contact points 82 and 83. In this exemplary embodiment as well, the ratio between depth a and width b of groove 69 can be adapted to the material properties.

In the case of the exemplary embodiment depicted in FIG. 6, the cross-sectional contour of ridge 67 is of substantially trapezoidal configuration, with preferably but not necessarily rounded corners. In the case of this exemplary embodiment as well, ridge 67 has an upstream sloping flank region 80 in which the opening cross section of fuel inlet fitting 60 narrows continuously in the fuel flow direction, and a downstream sloping flank region 81 in which the opening cross section of fuel inlet fitting 60 widens continuously in the fuel flow direction. The length of groove 69 is dimensioned such that retaining section 62 rests, at contact points 82 and 83, sealingly against sloping flank regions 80 and 81 of ridge 67.

The exemplary embodiments depicted can be combined in any fashion with one another in terms of the configuration of ridge 67 and groove 69. It is also possible, for example, to configure the cross-sectional contour of ridge 67 and/or of groove 69 as a portion of a circle, in particular as a semicircle. Many other geometrical shapes are possible and may be preferred depending on the production method used to configure ridge 67 and to configure groove 69.

What is claimed is:

1. A fuel injection valve, comprising:

a fuel inlet fitting including a ridge, the ridge being provided internally on the fuel inlet fitting and having at least one sloping flank region, an opening cross section of the fuel inlet fitting one of continuously narrowing and continuously widening in the at least one sloping flank region; and a fuel filter including a groove, the groove being provided on a retaining section of the fuel filter and being shaped so that the retaining section having the groove rests sealingly against the at least one sloping flank region, the ridge being inserted in a snap-lock manner into the groove.

2. The fuel injection valve according to claim 1, wherein the fuel injection valve is provided in a fuel injection system of an internal combustion engine.

3. The fuel injection valve according to claim 1, wherein the at least one sloping flank region of the ridge includes an upstream sloping flank region and a downstream sloping flank region, and wherein the opening cross section continuously narrows in the upstream sloping flank region in a fuel flow direction and the opening cross section continuously widens in the downstream sloping flank region in the fuel flow direction.

4. The fuel injection valve according to claim 3, wherein a gap is provided between the retaining section and an outer side of contact points, the contact points being positioned in the at least one sloping flank region, the gap compensating for a radial expansion of the retaining section.

5. The fuel injection valve according to claim 1, wherein a first cross-sectional contour of the ridge is curved in one of a wave-like manner and a circular manner, the first cross-sectional contour having a first radius of curvature.

6. The fuel injection valve according to claim 1, wherein a second cross-sectional contour of the groove is curved in one of a wave-like manner and a circular manner, the second cross-sectional contour having a second radius of curvature.

7. The fuel injection valve according to claim 1, wherein a first cross-sectional contour of the ridge is curved in one of a wave-like manner and a circular manner, the first cross-section contour having a first radius of curvature, and wherein a second cross-sectional contour of the groove is curved in one of the wave-like manner and the circular manner, the second cross-sectional contour having a second radius of curvature, the second radius of curvature being smaller than the first radius of curvature.

8. The fuel injection valve according to claim 1, wherein a first cross-sectional contour of the groove is shaped in one of a rectangular manner and a trapezoidal manner.

9. The fuel injection valve according to claim 1, wherein a second cross-sectional contour of the ridge is shaped in a trapezoidal manner.

10. The fuel injection valve according to claim 9, wherein the second cross-sectional contour has rounded comers.

11. The fuel injection valve according to claim 1, wherein the ridge is peripherally configured on an inner side of the fuel inlet fitting and the groove is peripherally configured on an outer side of the retaining section.

12. The fuel injection valve according to claim 1, wherein the fuel inlet fitting is composed of a metal material and the ridge is shaped using a non-material-removing production procedure.

13. The fuel injection valve according to claim 12, wherein the ridge is shaped using one of a rolling procedure and a pinching procedure.

14. The fuel injection valve according to claim 1, wherein the retaining section is composed of a plastic material.

* * * * *